(12) United States Patent
Kawakami et al.

(10) Patent No.: US 11,133,504 B2
(45) Date of Patent: Sep. 28, 2021

(54) NICKEL COMPLEX OXIDE AND METHOD OF MANUFACTURING LITHIUM NICKEL COMPLEX OXIDE

(71) Applicant: SUMITOMO METAL MINING CO., LTD., Tokyo (JP)

(72) Inventors: Yuji Kawakami, Ehime (JP); Tomomichi Nihei, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/758,215

(22) PCT Filed: Oct. 25, 2018

(86) PCT No.: PCT/JP2018/039769
§ 371 (c)(1),
(2) Date: Apr. 22, 2020

(87) PCT Pub. No.: WO2019/082992
PCT Pub. Date: May 2, 2019

(65) Prior Publication Data
US 2020/0287214 A1    Sep. 10, 2020

(30) Foreign Application Priority Data

Oct. 26, 2017 (JP) .............................. JP2017-207646

(51) Int. Cl.
*H01M 4/525* (2010.01)
*C01G 53/00* (2006.01)
*H01M 10/0525* (2010.01)

(52) U.S. Cl.
CPC ............ *H01M 4/525* (2013.01); *C01G 53/42* (2013.01); *H01M 10/0525* (2013.01); *C01P 2002/52* (2013.01); *C01P 2004/82* (2013.01); *C01P 2006/40* (2013.01)

(58) Field of Classification Search
CPC ...... C01G 53/006; C01G 53/40; C01G 53/42; C01P 2002/52; C01P 2002/54; C01P 2004/80; C01P 2004/82; C01P 2006/12; C01P 2006/40; C01P 2006/80; H01M 10/0525; H01M 4/525; Y02E 60/10
See application file for complete search history.

(56) References Cited

U.S. PATENT DOCUMENTS

| 7,585,350 B2 | 9/2009 | Duarte et al. |
| 2004/0197658 A1 | 10/2004 | Kase et al. |
| 2011/0166395 A1* | 7/2011 | Wolk ...................... B01J 21/04 |
| | | 568/881 |

(Continued)

FOREIGN PATENT DOCUMENTS

| EP | 1800773 | 6/2007 |
| JP | H10-188975 | 7/1998 |

(Continued)

OTHER PUBLICATIONS

International Search Report dated Jan. 29, 2019 with respect to PCT/JP2018/039769.

*Primary Examiner* — Mark Kopec
*Assistant Examiner* — Jaison P Thomas
(74) *Attorney, Agent, or Firm* — IPUSA, PLLC (57) ABSTRACT

A nickel complex oxide having a carbon content of 0.15% by mass or lower.

3 Claims, 2 Drawing Sheets

(56) References Cited

U.S. PATENT DOCUMENTS

| | | | | |
|---|---|---|---|---|
| 2011/0201847 A1* | 8/2011 | Wolk | ............... | B01J 35/023 |
| | | | | 568/813 |
| 2014/0186709 A1* | 7/2014 | Iwanaga | ............ | H01M 4/525 |
| | | | | 429/223 |
| 2016/0293950 A1* | 10/2016 | Kamata | ............. | C01G 53/006 |
| 2017/0043403 A1* | 2/2017 | Ozaki | ................ | C22C 19/03 |
| 2019/0319271 A1* | 10/2019 | Yamamoto | ......... | H01M 4/628 |

FOREIGN PATENT DOCUMENTS

| | | |
|---|---|---|
| JP | 2012-119093 | 6/2012 |
| WO | WO2013/015007 | 1/2013 |

\* cited by examiner

NICKEL COMPLEX OXIDE AND METHOD OF MANUFACTURING LITHIUM NICKEL COMPLEX OXIDE

TECHNICAL FIELD

The present invention relates to a nickel complex oxide and a method of manufacturing a lithium nickel complex oxide.

BACKGROUND ART

In recent years, with the spread of portable electronic devices such as cellular phones and notebook personal computers, the development of small, lightweight secondary batteries with high energy density is required. In addition, the development of high-output secondary batteries for electric vehicles such as a hybrid vehicle is also required. A non-aqueous electrolyte secondary battery that meets these requirements is a lithium-ion secondary battery.

The lithium-ion secondary battery is made with, for example, an anode, a cathode, an electrolyte solution, and so on, and the active materials of the anode and cathode are made of materials capable of de-inserting and inserting lithium.

The lithium ion rechargeable battery using a lithium ion complex oxide, especially a lithium cobalt complex oxide, which is relatively easy to synthesize, as the cathode material, are expected to have a high energy density because it can obtain a high voltage of 4V class, and its practical application is advancing. In a battery using the lithium cobalt complex oxide, numerous developments have been made to obtain excellent initial capacity and cycle characteristics, and a variety of results have already been achieved.

However, because the lithium cobalt complex oxide includes an expensive cobalt compound as the raw material, a unit price per the cell capacity using the lithium cobalt complex oxide becomes significantly higher than that using a nickel hydride battery, and an application of use is considerably limited.

For this reason, it is highly expected that the cost of the cathode material is reduced for a small secondary battery for portable devices and a large secondary battery for electric power storages and electric vehicles and the manufacture of cheaper lithium ion secondary batteries is enabled. The realization of this expectation is of great industrial significance.

A new material of the active material for lithium-ion secondary battery can be a lithium nickel complex oxide using nickel, which is less expensive than cobalt. Because the lithium nickel complex oxide has a lower electrochemical potential than the lithium cobalt complex oxide, decomposition by oxidation of the electrolyte solution is unlikely to be a problem, and a higher capacity can be expected. As the lithium nickel complex oxide exhibits a high battery voltage similar to that of the cobalt system, development has been actively carried out.

However, when a lithium-ion secondary battery is manufactured using the lithium nickel complex oxide synthesized purely from nickel as a cathode material, it has a disadvantage that the cycle characteristics are inferior to those of a cobalt system, and a battery performance is relatively easily impaired by use and storage in a high temperature environment. For this reason, the lithium nickel complex oxide in which a part of nickel is replaced by cobalt or aluminum is generally known.

For example, Patent Document 1 discloses a cathode active material for a non-aqueous electrolyte secondary battery including a lithium nickel complex oxide as represented by the following general formula (1), wherein the specific surface area is 0.5 to 2.05 m²/g, and the carbon content of the lithium nickel complex oxide is adjusted to be 0.08% by mass or lower of the total amount.

General Formula: $Li_bNi_{1-a}M1_aO_2$ (1)

(wherein M1 represents at least one element selected from a transition metal element other than Ni, a II group element, or a XIII group element, a is defined by $0.01 \leq a \leq 0.5$, and b is defined by $0.85 \leq b \leq 1.05$).

BACKGROUND ART DOCUMENTS

Patent Documents

[Patent Document 1]
International Patent Publication No. 2013/015007

SUMMARY OF INVENTION

Problem to be Solved by the Invention

In recent years, however, further improvements in the performance of lithium-ion batteries have been required. Therefore, in order to sufficiently increase the output voltage of, for example, the non-aqueous electrolyte secondary battery, the reaction resistance of the lithium nickel complex oxide being a cathode active material for the non-aqueous electrolyte secondary battery, for example, is required to suppress the reaction resistance.

In view of the above-described problems in the prior art, it is an object of the present invention to provide a nickel complex oxide capable of manufacturing a lithium nickel complex oxide enabling to suppress the reaction resistance in a non-aqueous electrolyte secondary battery.

Means for Solving Problems

In order to solve the above problem, according to one aspect of the present invention, there is provided a nickel complex oxide having a carbon content of 0.15% by mass or lower.

Effects of the Invention

According to an aspect of the present invention, there is provided a nickel complex oxide capable of manufacturing a lithium nickel complex oxide enabling to suppress the reaction resistance in a non-aqueous electrolyte secondary battery.

MODE FOR CARRYING OUT THE INVENTION

While embodiments of the invention will now be described with reference to the accompanying drawings, the invention is not limited to the following embodiments, and various modifications and substitutions can be made to the following embodiments without departing from the scope of the invention.

[Nickel Complex Oxide]

First, a composition example of the nickel complex oxide according to the present embodiment will be described.

The nickel complex oxide according to this embodiment can have a carbon content of 0.15% by mass or lower.

The inventors of the present invention have intensively reviewed a nickel complex oxide which can be manufactured to suppress the reaction resistance in a non-aqueous electrolyte secondary battery, that is, the nickel complex oxide is preferably used as a raw material for a lithium nickel complex oxide.

First, Patent Document 1 discloses that a low internal resistance can be achieved by controlling the amount of lithium carbonate present on the particle surfaces of the lithium nickel complex oxide so as to be below the specified value. Patent Document 1 discloses that the amount of lithium carbonate present on the particle surfaces of the lithium nickel complex oxide can be adjusted by selecting the conditions for the water washing process.

However, the inventors of the present invention have found that the trace carbon components present in the particles of lithium nickel complex oxides may also affect the reaction resistance of non-aqueous electrolyte secondary batteries such as lithium-ion secondary batteries. As a result of further investigation, it was thought that a trace carbon content in the particles of lithium nickel complex oxide which affects the reaction resistance was attributable to the nickel complex oxide, which is one of the raw materials. Then, it was found that the present invention can be suitably applied to a raw material of the lithium nickel complex oxide that can suppress the reaction resistance in the non-aqueous electrolyte secondary battery, by setting the carbon content of the nickel complex oxide to be in a predetermined range. Thus, the present invention has been completed.

According to the inventors of the present invention, it is preferable that the carbon content of the nickel complex oxide according to the present embodiment be 0.15% by mass or lower, and it is more preferable that the carbon content be 0.10% by mass or lower.

The lower limit of the carbon content of the nickel complex oxide according to the present embodiment is not specifically limited. For example, it is 0 or more because the lower the carbon content is preferably small. However, carbon is easily mixed in a process of manufacturing the nickel complex oxide, etc., and if carbon is reduced excessively, a cost may increase. Therefore, the carbon content of the nickel complex oxide according to the present embodiment is preferably, for example, 0.02% by mass.

Although the method for evaluating the carbon content of the nickel complex oxide according to this embodiment is not specifically limited, it can be evaluated by, for example, a high-frequency combustion-infrared absorption method.

In addition, aluminum in the aluminum compound present on the particle surfaces of the nickel complex oxide according to the present embodiment preferably have a mass ratio of 7.0% or lower to the nickel complex oxide according to the present embodiment.

The aluminum compound such as aluminum oxide (alumina) present on the particle surfaces of the nickel complex oxide is hardly solidified on the surface of the lithium nickel complex oxide manufactured using the nickel complex oxide, and are mainly present on the particle surfaces. Most of the aluminum compound present on the surfaces of particles of lithium nickel complex oxides is lost during the manufacturing process.

Accordingly, in a case where the nickel complex oxide contains aluminum, if aluminum in the aluminum compound present on the particle surfaces of the nickel complex oxide has a high mass ratio to the nickel complex oxide, the content ratio of aluminum in the lithium nickel complex oxide obtained by using the nickel complex oxide inevitably decreases. When the lithium nickel complex oxide contains aluminum, the proportion of aluminum in the lithium nickel complex oxide is increased, so that the cycle characteristics of the non-aqueous electrolyte secondary battery using the lithium nickel complex oxide can be specifically enhanced.

According to reviews by the inventors of the present invention, the ratio of the aluminum compound present on the particle surfaces of the lithium nickel complex oxide obtained from the nickel complex oxide can be sufficiently suppressed by setting the mass ratio of aluminum in the aluminum compound existing on the particle surfaces of the nickel complex oxide to 7.0% by mass or lower to the nickel complex oxide. The above setting is preferable because the content ratio of aluminum in the obtained lithium nickel complex oxide is sufficiently secured, and the cycle characteristics in a case where the non-aqueous electrolyte secondary battery is used can be specifically enhanced.

It is more preferable that the mass ratio of aluminum in the aluminum compound present on the particle surfaces of the nickel complex oxide to the nickel complex oxide be 6.0% by mass or lower.

In a case where the nickel complex oxide contains aluminum, the lower limit value of the mass ratio of aluminum in the aluminum compound present on the particle surfaces of the nickel complex oxide is preferably smaller.

However, if aluminum in the aluminum compound present on the particle surfaces of the nickel complex oxide is adjusted to reduce the mass ratio of the aluminum to the nickel complex oxide in the case where the nickel complex oxide contains the aluminum, it becomes necessary to suppress the thermal energy applied to nickel complex hydroxide in a roasting process. Thus, when heat energy applied in the roasting process is suppressed, the crystallinity of the nickel complex oxide is reduced, and the cycle characteristic may be reduced. For this reason, in the case where the nickel complex oxide contains aluminum, the mass ratio of the aluminum in the aluminum compound present on the particle surfaces of the nickel complex oxide is preferably 1.5% by mass or higher and more preferably 3.0% by mass or higher.

The mass ratio of aluminum of the aluminum compound present in the particle surfaces of the nickel complex oxide particles in the nickel complex oxide can be measured and calculated, for example, by the following procedure.

First, the obtained nickel complex oxide is water-washed to prepare a sample of the nickel complex oxide after the water-washing.

In this case, the conditions of water-washing are not specifically limited, and the conditions can be selected so that the aluminum compound present in the surface of the nickel complex oxide can be water-washed and removed. For example, the water-washing can be performed by adding pure water of 20° C. to the nickel complex oxide, stirring the slurry adjusted so that the electrical conductivity of a liquid part of slurry is 45 mS/cm for 20 minutes, water-washing, filtering, and drying.

In addition, the water used for the water-washing is not specifically limited, but the electrical conductivity of the water is preferably lower than 10 μS/cm, more preferably, 1 μS/cm or lower.

Then, the aluminum content of the aluminum compound contained in the nickel complex oxide after the water-washing with is measured. "Before the water-washing" means the nickel complex oxide that has not been subjected to the water-washing. The aluminum content of the aluminum compound contained in the nickel complex oxide before and after the water-washing can be measured by, for example, ICP-AES (Inductively Coupled Plasma-Atomic Emission Spectrometry (ICP Emission Spectrometry)).

The aluminum content of the aluminum compound contained in the nickel complex oxide before and after the water-washing is calculated as the content per unit mass of the nickel complex oxide before the water-washing.

Then, the obtained measurement value can be used to calculate the mass ratio of aluminum in the aluminum compound present on the particle surfaces of the nickel complex oxide in the nickel complex oxide by using the following Equation (1).

(Mass ratio of aluminum in aluminum compound present on particle surfaces of nickel complex oxide to nickel complex oxide)=$(Al_{before} - Al_{after})/W \times 100$     (1)

In addition, $Al_{before}$, $Al_{after}$, and W in Equation (1) above each have the following meanings.

$Al_{before}$: Aluminum content of aluminum compound in nickel complex oxide before water-washing $Al_{after}$: Aluminum content of aluminum compound in nickel complex oxide after water-washing W: Unit mass of nickel complex oxide before water-washing As indicated in the above-described Equation (1), by subtracting the aluminum content of the aluminum compound contained in the nickel complex oxide before water-washing from the aluminum content of the aluminum compound contained in the nickel complex oxide after water-washing, the aluminum content of the aluminum compound present on the particle surfaces of the nickel complex oxide before water-washing can be calculated.

Then, by dividing the aluminum content of the aluminum compound present on the particle surfaces by the unit mass of the nickel complex oxide before water-washing, the mass ratio of aluminum in the aluminum compound present on the surface of the nickel complex oxide particles to the nickel complex oxide can be calculated.

As is obvious from the above-described operations, the mass ratio of aluminum in the aluminum compound present on the particle surfaces of the nickel complex oxide to the nickel complex oxide indicates the change ratio of the aluminum content relative to the nickel complex oxide before and after the water-washing, and can be changed to refer to the mass ratio of dissolved aluminum when the nickel complex oxide is water-washed to the nickel complex oxide.

The specific composition of the nickel complex oxide according to this embodiment is not specifically limited, but for example, nickel complex oxide (nickel cobalt complex oxide) represented by a general formula: $Ni_{(1-y-z)}Co_yM_zO_{1+\alpha}$ (wherein M represents at least one element selected from Al and Ti, and y and z respectively satisfy $0 \leq y \leq 0.35$, $0.005 \leq z \leq 0.15$, and $-0.2 \leq \alpha \leq 0.2$) is included. Incidentally, in the above-described general formula, y is preferably $0.01 \leq y \leq 0.35$, more preferably $0.02 \leq y \leq 0.20$, and furthermore preferably $0.03 \leq y \leq 0.15$.

In addition, although the specific surface area of the nickel complex oxide according to this embodiment is not specifically limited, it is preferable that the specific surface area is, for example, 20 m²/g or more and 100 m²/g or less, and it is more preferable that the specific surface area is 30 m²/g or more and 90 m²/g or less.

This is because the specific surface area is 20 m²/g or more, when firing a mixture of a lithium compound to produce a lithium nickel complex oxide, lithium in the lithium compound easily diffuses into the nickel complex oxide, thereby specifically increasing the reactivity. However, if the specific surface area is made greater than 100 m²/g, processing, such as milling, may be necessary for the nickel complex oxide. Therefore, the specific surface area is preferably set to be 100 m²/g or less.

[Method of Manufacturing Nickel Complex Oxide]

Although a method of manufacturing the nickel complex oxide according to the present embodiment is not specifically limited, it is possible to include a roasting process of roasting the nickel complex hydroxide.

Specifically, for example, a roasting process of roasting a nickel complex hydroxide (nickel cobalt complex hydroxide) represented by a general formula:

$Ni_{(1-y-z)}Co_yM_z(OH)_{2+\beta}$, wherein M represents at least one element selected from Al and Ti, wherein y and z respectively satisfy the following conditions: $0 \leq y \leq 0.35$, $0.005 \leq z \leq 0.15$, and $-0.2 \leq \beta \leq 0.2$.

Incidentally, in the above-described general formula, y is preferably $0.01 \leq y \leq 0.35$, more preferably $0.02 \leq y \leq 0.20$, and further preferably $0.03 \leq y \leq 0.15$.

Incidentally, the method of manufacturing the nickel complex hydroxide is not specifically limited, and it can be manufactured by coprecipitating the adding element M with nickel, which is a containing metal, and another adding metal such as cobalt, described above.

The nickel complex hydroxide used in the roasting process is not limited to the above nickel complex hydroxide (nickel cobalt complex oxide). A nickel complex hydroxide corresponding to the composition of the target nickel complex oxide can be subjected to the roasting process.

The conditions for roasting the nickel complex hydroxide are not specifically limited, and the roasting conditions of the obtained nickel complex oxide are preferably selected so as to sufficiently reduce the carbon content.

According to the reviews by the inventors of the present invention, the carbon content of the obtained nickel complex oxide can be adjusted by selecting roasting conditions such as a roasting time, a roasting temperature, and a rate of temperature rise up to the roasting temperature. Therefore, a nickel complex oxide having a desired carbon content can be manufactured by performing a preliminary test and selecting a roasting condition.

For example, the roasting temperature in the roasting process is preferably higher than 450° C. and 750° C. or lower, more preferably, 500° C. to 730° C., furthermore preferably, 600° C. to 730° C.

The atmosphere in which the particles of the nickel complex hydroxide are roasted is not specifically limited, and may be a non-reducing atmosphere. It is preferably carried out under an atmosphere of an oxygen containing gas or under an flow of an oxygen containing gas. Meanwhile, an oxygen content ratio in an oxygen containing gas is not specifically limited. For example, the oxygen content ratio is preferably 18 vol % or higher, and more preferably 20 vol % or higher. In addition, because the oxygen containing gas may be oxygen, the oxygen content may be 100 vol % or less. Specifically, air is preferably used as the oxygen containing gas.

The equipment used for roasting is not specifically limited, and it is sufficient that the nickel complex hydroxide can be heated in a non-reducing atmosphere, and an electric furnace without gas generation is preferably used.

In addition, in order to reduce and remove the aluminum compound adhering to the surface of the nickel complex oxide obtained by the roasting process, a water-washing process may be performed as necessary.

However, in a case where the aluminum compound present on the particle surfaces of the above nickel complex oxide evaluate a mass ratio of aluminum of aluminum compound in the nickel complex oxide and this water-washing process is performed, the above evaluation is preferably performed before the water-washing process.

In the water-washing process, it is preferable that the nickel complex oxide obtained in the roasting process is mixed with water to form a slurry, and the electrical conductivity of a liquid part of the slurry is controlled to be 30 mS/cm or higher and 60 mS/cm or lower within a temperature range of 10° C. to 40° C. This is because the electrical conductivity of the slurry produced by the water-washing process can be within the above-described range, so that an excessive element such as an aluminum compound, adhered to the particle surfaces of the nickel complex oxide can be selectively and sufficiently reduced.

Although the water used in the water-washing process is not specifically limited, it is preferable that the electrical conductivity of the water be lower than 10 μS/cm, and the electrical conductivity of the water be 1 μS/cm or lower.

The water-washing time is not specifically limited. However, it is preferable that the water-washing time be 5 minutes or longer and 2 hours or shorter, for example, in order to increase the productivity while sufficiently removing the excess element adhered to the particle surfaces of the nickel complex oxide. The prepared slurry is preferably stirred during the water-washing.

After the water washing process, a drying process of filtering the slurry and drying the recovered nickel complex oxide after washing can be performed.

The drying conditions in the drying process are not specifically limited, but it is preferable that the drying conditions are between 80° C. and 450° C., more preferably between 100° C. and 350° C., and further preferably between 120° C. and 350° C.

The atmosphere of the drying process is not specifically limited, but preferably is carried out in an atmosphere in which the carbon content is suppressed, for example, in a vacuum atmosphere.

[Lithium Nickel Complex Oxide]

Next, an example of the configuration of the lithium nickel complex oxide according to the present embodiment will be described.

The lithium nickel complex oxide according to the present embodiment can be manufactured using the above nickel complex oxide, and the composition thereof is not specifically limited.

The lithium nickel complex oxide according to the present embodiment is not specifically limited, for example, a lithium nickel complex oxide (lithium nickel cobalt oxide) represented by a general formula:

$Li_xNi_{(1-y-z)}Co_yM_zO_{2+\gamma}$ (wherein M represents at least one element selected from Al and Ti, and x, y, and z respectively satisfy the following conditions:

0.90≤x≤1.10, 0≤y≤0.35, 0.005≤z≤0.15, and −0.2≤γ≤0.2.

It is preferable that x is 0.95≤x1.08 in the above-described general formula. In addition, it is preferable that y be 0.01≤y≤0.35, more preferably 0.02≤y≤0.20, and even more preferably 0.03≤y≤0.15.

The lithium nickel complex oxide according to this embodiment can be manufactured from the above nickel complex oxide. Therefore, when the lithium nickel complex oxide is used as the cathode active material as a non-aqueous electrolyte secondary battery, the non-aqueous electrolyte secondary battery can be used such that the reaction resistance is suppressed.

[Method of Manufacturing Lithium Nickel Complex Oxide]

The method of manufacturing the lithium nickel complex oxide according to this embodiment is not specifically limited. A method of manufacturing the lithium nickel complex oxide according to this embodiment may include, for example, the following processes.

A mixing process of preparing a mixture of the above nickel complex oxide and a lithium compound.

A baking process of baking this mixture.

Each process will be described below.

(Mixing Process)

The mixing process is the process of mixing a nickel complex oxide and a lithium compound to obtain a mixture (mixing powder).

It is preferable that the nickel complex oxide and the lithium compound be mixed so that the ratio (Li/Me) of the number of metal atoms other than lithium and the number (Li) of lithium atoms in the mixture is 0.90 or higher and 1.10 or lower. In particular, it is more preferable to mix so that the ratio (Li/Me) of the number of lithium atoms in the mixture to the number of metal atoms of other than the lithium atoms is 0.95 or higher and 1.08 or lower. Because Li/Me hardly varies before and after the firing process described below, Li/Me in the mixture subjected to the firing process is approximately the same as Li/Me in the resulting lithium nickel complex oxide. Therefore, it is preferable to mix Li/Me in the mixture to be prepared in the mixing process so as to be the same as Li/Me in the lithium nickel complex oxide to be obtained.

Although the lithium compound to be used in the mixing process is not specifically limited, one or more types selected from, for example, lithium hydroxide, lithium carbonate, or the like, may be preferably used.

As the mixing measure for mixing the nickel complex oxide and the lithium compound in the mixing process, a general mixing machine may be used. For example, a shaker mixer, a LÖDIGE mixer, a Julia mixer, a V blender, or the like may be used.

(Firing Process)

In the firing process, the mixture obtained in the above-described mixing process is fired to form a lithium nickel complex oxide. When the mixture is fired during the firing process, lithium in the lithium compound diffuses into the nickel complex oxide, forming a lithium nickel complex oxide.

In the firing process, although the firing temperature for firing the mixture is not specifically limited. For example, the firing temperature is preferably 600° C. or higher and 950° C. or lower and, more preferably, 700° C. or higher and 900° C. or lower.

By setting the firing temperature to 600° C. or more, the diffusion of lithium to the nickel complex oxide can be sufficiently advanced, and the crystal structure of the lithium nickel complex oxide contained in the resulting lithium nickel complex oxide can be made specifically uniform. For this reason, it is preferable that the product be used as the cathode active material, because the battery characteristics can be specifically enhanced. Also, because the reaction can be proceeded sufficiently, excess lithium residues and residual unreacted particles can be suppressed.

By setting the firing temperature to 950° C. or lower, it is possible to suppress the progress of sintering between the particles of the lithium nickel complex oxide produced. In addition, it is possible to suppress the generation of abnormal grain growth and suppress the coarseness of the obtained lithium nickel complex oxide particles.

In addition, in the process of raising the temperature to the heat treatment temperature, the temperature can be kept at a temperature near the melting point of the lithium compound for 1 hour or longer and 5 hours or shorter. In this case, it is preferable that the reaction can be performed more uniformly.

Regarding the firing time in the firing process, a keeping time at a predetermined temperature, that is, the above firing temperature, is not specifically limited, but preferably 2 hours or longer, and more preferably 3 hours or longer. This is because the keeping time of 2 hours or longer at the firing temperature can sufficiently promote production of the lithium nickel complex oxide and prevent the unreacted material from being residue more reliably.

Although the upper limit value of the keeping time at the firing temperature is not specifically limited, it is preferable that the keeping time is 24 hours or shorter in consideration of productivity or the like.

Although the atmosphere during firing is not specifically limited, it is preferable to use an oxidizing atmosphere. As the oxidizing atmosphere, an oxygen containing gas atmosphere may be preferably used, and for example, it is more preferable to use an atmosphere having an oxygen concentration of not less than 18 vol % and not more than 100 vol %.

This is because the crystallinity of the lithium nickel complex oxide can be specifically enhanced by setting the oxygen concentration in the atmosphere to 18 vol % or more during firing.

In the case of the atmosphere containing oxygen, for example, air (atmosphere), oxygen, or a mixture of oxygen and an inert gas may be used as the gas constituting the atmosphere.

When a mixture of oxygen and an inert gas is used as the gas constituting the oxygen containing gas atmosphere, for example, as described above, it is preferable that the oxygen concentration in the mixture satisfy the above range.

In particular, in the firing process, it is preferred to carry out the process in a gas flow of an oxygen containing gas, and more preferably in an air or oxygen flow. Specifically, it is preferable to carryout in an oxygen flow in view of battery characteristics.

Incidentally, a furnace used for firing is not specifically limited. For example, the furnace capable of firing a mixture in air or an oxygen flow may be used. The furnace used for firing is preferably an electric furnace with no gas generation in order to maintain a uniform atmosphere in the furnace, and both batch type and continuous type furnaces can be used.

The lithium nickel complex oxide obtained by the firing process may be aggregated or mildly sintered. In this case, after the firing process, the lithium nickel complex oxide may be crushed to loosen.

Here, the crushing is an operation in which mechanical energy is injected into the aggregation composed of multiple secondary particles produced by sintering necking between secondary particles during firing, etc., and the secondary particles are mutually separated without substantially breaking the secondary particles themselves, and the aggregation is loosened.

Calcination may also be performed prior to the firing process.

When the calcination is performed, the temperature of the calcination is not specifically limited, but may be lower than the firing temperature in the firing process. For example, it is preferable that the calcination temperature be 250° C. or higher and 600° C. or lower, more preferably, 350° C. or higher and 550° C. or lower.

For example, a calcination time, that is, the keeping time at the above calcination temperature, is preferably 1 hour or longer and 10 hours or shorter, and more preferably, 3 hours or longer and 6 hours or shorter.

After the calcination process, the process can be cooled and thereafter subjected to the firing process. However, the firing process can be carried out continuously by raising the temperature from the calcination temperature to the firing temperature.

Incidentally, the atmosphere in which the calcination is performed is not specifically limited, but for example, the atmosphere may be the same as that in the firing process.

By performing the calcination, the diffusion of lithium to the nickel complex oxide is sufficiently performed, and specifically uniform lithium nickel complex oxide can be obtained.

A water-washing process may also be performed after the firing process, if necessary.

In the water-washing process, the lithium nickel complex oxide obtained in the firing process is preferably mixed with water to form a slurry, and the electrical conductivity of the liquid part of the slurry is controlled to be 30 mS/cm or higher and 60 mS/cm or lower within a temperature range of 10° C. or higher and 40° C. or lower. This is because the electrical conductivity of the slurry produced by the water-washing process is within the above range, it is possible to selectively and sufficiently reduce an excess element, such as excessive lithium, adhered to the particle surfaces of the lithium nickel complex oxide.

Although water used in the water-washing process is not specifically limited, the electrical conductivity of the water is preferably less than 10 μS/cm, and more preferably, less than 1 μS/cm.

The water-washing time is not specifically limited. However, the water-washing time is preferably 5 minutes or longer and 2 hours or shorter, for example, in order to increase productivity while sufficiently removing the excess element adhered to the particle surfaces of the lithium nickel complex oxide. The prepared slurry is preferably stirred during the water-washing.

After the water-washing process, a drying process, in which the slurry is filtered and the recovered lithium nickel complex oxide is dried after water-washing, can be performed.

The drying conditions in the drying process are not specifically limited. However, the drying conditions are preferably between 80° C. and 450° C., more preferably between 100° C. and 350° C., and furthermore preferably between 120° C. and 350° C.

The atmosphere of the drying process is not specifically limited, but preferably is carried out in an atmosphere where the carbon content is suppressed, for example, more preferably in a vacuum atmosphere.

[Non-Aqueous Electrolyte Rechargeable Battery]

Next, a structure example of a non-aqueous electrolyte secondary battery according to this embodiment will be described.

The non-aqueous electrolyte secondary battery according to this embodiment can have a cathode using the lithium nickel complex oxide described above as the cathode material. That is, the non-aqueous electrolyte secondary battery according to this embodiment can have a structure having a cathode including the lithium nickel complex oxide as described above.

First, the structure example of the non-aqueous electrolyte secondary battery according to this embodiment will be described.

The non-aqueous electrolyte secondary battery according to this embodiment can have a structure substantially similar to that of a general non-aqueous electrolyte secondary battery, except that the lithium nickel oxide composite described above was used as the cathode material.

Specifically, the non-aqueous electrolyte secondary battery of this embodiment can have the structure with a case and a cathode, an anode, an electrolyte, and a separator contained within the case.

More specifically, the cathode and the anode can be laminated through a separator to form an electrode body, and the resulting electrode body can be impregnated with the electrolyte solution. It is possible to have a structure in which a cathode current collector and a cathode terminal that leads to the outside and an anode collector and an anode terminal that leads to the outside are respectively connected to each other using a lead for current collection and the like and are hermetically sealed inside the case.

The structure of the non-aqueous electrolyte secondary battery according to the present embodiment is not limited to the above-described examples, and various shapes, such as cylindrical and laminated shapes, can be employed.

An example of the structure of each parts will be described below.

(Cathode)

First, the cathode is described.

The cathode is a sheet-like part. For example, the surface of the current collector made of aluminum foil is coated by the cathode material paste containing the lithium nickel complex oxide described above and the coating cathode material paste is dried to form the cathode. The cathode is appropriately processed in accordance with the battery to be used. For example, a cutting process may be performed in which a suitable size is formed depending on the desired battery, or a pressurizing compression process may be performed by a roll press or the like in order to increase the electrode density.

The above-described cathode material paste can be formed by adding a solvent to the cathode material and kneading it. The cathode material can be formed by mixing the above lithium nickel complex oxide in powder form, a conductive material, and a binding agent.

The conductive material is added to provide appropriate conductivity to the electrodes. Although the material of the conductive material is not specifically limited, graphite such as natural graphite, artificial graphite and expanded graphite, or carbon black-based material such as acetylene black and Ketchen Black ("Ketchen Black" is a registered trademark) may be used.

The binding agent functions to anchor the lithium nickel complex oxide, which is the cathode active material. The binding agent used for such a cathode material is not specifically limited. However, one or more kinds selected from, for example, polyvinylidene fluoride (PVDF), polytetrafluoroethylene (PTFE), fluorine rubber, ethylene propylene diene rubber, styrene butadiene, cellulosic resin, polyacrylic acid, or the like can be used.

In addition, activated charcoal or the like may be added to the cathode material. The electric double layer capacity of the cathode can be increased by adding activated charcoal or the like to the cathode material.

The solvent acts to dissolve the binding agent and disperses the lithium nickel complex oxide, conductive material, activated carbon, and the like in the binding agent. The solvent is not specifically limited, but an organic solvent such as, for example, N-methyl-2-pyrrolidone may be used.

In addition, the mixing ratio of each substance in the cathode material paste is not specifically limited, and may be the same as in the case of, for example, the cathode of an ordinary non-aqueous electrolyte secondary battery. For example, when the solid content of the cathode material without the solvent is 100 parts by mass, the content of the lithium nickel complex oxide can be 60 parts by mass or higher and 95 parts by mass or lower, the content of the conductive material can be 1 part by mass or higher and 20 parts by mass or lower, and the content of the binding agent can be 1 part by mass or higher and 20 parts by mass or lower.

The method of manufacturing the cathode is not limited to the above method. For example, the cathode material or the cathode paste may be subjected to press molding and then dried under a vacuum atmosphere.

(Anode)

The anode is a sheet-like part. For example, metallic lithium, lithium alloy, or the like may be used for the anode. The anode can also be formed by applying and drying the anode material paste on the surface of a metal foil current collector, such as copper.

When the anode material paste is applied to the surface of the metal foil current collector and dried to form the anode, the anode is formed by substantially the same method as the above-described cathode, although the components constituting the anode material paste, the composition thereof, the material of the current collector, etc. are different, and various processes are performed as necessary as well as the cathode.

The anode paste can be made into a paste by adding a suitable solvent to anode material which is a mixture of the anode active material and the binding agent.

As the anode active material, for example, a material containing lithium, such as metallic lithium or a lithium alloy, or inserting material capable of inserting and de-inserting lithium ions can be employed.

Although inserting material is not specifically limited, one or more kinds selected from, for example, an organic compound firing substance such as natural graphite, artificial graphite, and phenolic resins, and carbon material powders such as coke can be used.

When such inserting material is adopted as the anode active material, a fluorine-containing resin such as PVDF may be used as the binding agent, and as a solvent for dispersing the anode active material in the binding agent, an organic solvent such as N-methyl-2-pyrrolidone may be used.

(Separator)

The separator is arranged between the cathode and the anode, and it separates the cathode and the anode, and functions to keep the electrolyte solution.

As the material of the separator, for example, a thin film, such as polyethylene or polypropylene, having a large number of fine pores may be used. However, as long as the separator has the above-described function, the separator is not specifically limited.

(Electrolyte Solution)

The electrolyte solution is a solution of lithium salt as a supporting salt in the organic solvent.

The organic solvent may be used as one kind independently of or a mixture of two or more kinds of a cyclic carbonate such as ethylene carbonate, propylene carbonate, butylene carbonate, or trifluoropropylene carbonate; a chain carbonate such as diethyl carbonate, dimethyl carbonate, ethyl methyl carbonate, or dipropyl carbonate; an ether compound such as tetrahydrofuran, 2-methyl tetrahydrofuran, or dimethoxyethane; a sulfur compound such as ethyl methyl sulfone or butane sultone; or a phosphorus compound such as triethyl phosphate or trioctyl phosphate.

The supporting salt may be $LiPF_6$, $LiBF_4$, $LiClO_4$, $LiAsF_6$, $LiN(CF_3SO_2)_2$, or a composite salt thereof.

The electrolyte solution may include a radical scavenger, a surfactant, a flame retardant, or the like to improve the battery property.

Heretofore, the non-aqueous electrolyte secondary battery according to this embodiment has been described as an example of a mode in which an electrolyte solution (a non-aqueous electrolyte solution) is used as the electrolyte. However, the non-aqueous electrolyte secondary battery according to this embodiment is not limited to such form. For example, a solid electrolyte may be used as the electrolyte (non-aqueous electrolyte). The solid electrolyte has the property to withstand high voltages. Examples of the solid electrolyte include inorganic solid electrolyte and organic solid electrolyte.

The inorganic solid electrolyte is an oxide-based solid electrolyte and a sulfide-based solid electrolyte.

The oxide-based solid electrolyte is not specifically limited. For example, a material containing oxygen (O) and having a lithium ion conductivity and an electron insulating property may be preferably used. An example of the oxide-based solid electrolyte may be at least one kind selected from lithium phosphate ($Li_3PO_4$), $Li_3PO_4NX$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ $(0 \leq X \leq 1)$, $Li_{1+X}Al_XGe_{2-X}(PO_4)_3$ $(0 \leq X \leq 1)$, $(LiTi_2(PO_4)_3$, $Li_{3X}La_{2/3-X}TiO_3$ $(0 \leq X \leq 2/3)$, $Li_5La_3Ta_2O_{12}$, $Li_7La_3Zr_2O_{12}$, $Li_6Ba_2Ta_2O_{12}$, $Li_{3.6}Si_{0.6}P_{0.4}O_4$, and so on.

The sulfide-based solid electrolyte is not specifically limited. For example, a material containing sulfur (S) and having a lithium ion conductivity and an electron insulating property may be preferably used. As a sulfide-based solid electrolyte, for example, at least one type selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li2_S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, or the like can be used.

The inorganic solid electrolyte other than the above may be used. For example, $Li_3N$, $LiI$, $Li_3N$—$LiI$—$LiOH$, or the like may be used.

The organic solid electrolyte is not specifically limited as long as the organic solid electrolyte is a polymer compound exhibiting an ionic conductivity. For example, polyethylene oxide, polypropylene oxide, a copolymer thereof, and the like may be used. The organic solid electrolyte may also contain supporting salt (lithium salt).

As described above, when providing the non-aqueous electrolyte secondary battery using a solid electrolyte as the electrolyte, said differently, a total solid battery is used, the structure other than the cathode active material can be changed from the above structure as necessary.

The non-aqueous electrolyte secondary battery according to this embodiment has a cathode that uses lithium nickel complex oxide as the cathode material. Therefore, it is possible to provide a non-aqueous electrolyte secondary battery having the low reaction resistance at the cathode being an excellent battery property.

EXAMPLE

Hereinafter, the invention will be described in more detail with reference to examples. However, the invention is not limited to the following examples.

Example 1

(Manufacture of nickel complex oxide)

Nickel complex oxide was prepared by the following procedure.

$Ni_{0.88}Co_{0.09}Al_{0.03}(OH)_2$, which was prepared by crystallization method as a nickel complex hydroxide, was prepared, and the nickel complex hydroxide was roasted (a roasting process) at 500° C. under atmospheric atmosphere (oxygen: 21 vol %).

In the roasting process, the roasting temperature was increased to 500° C. at a rate of 10° C./min, and the temperature was kept at the roasting temperature for 3 hours after reaching the roasting temperature. Thereafter, heating was stopped and made ambient to be a room temperature.

As described above, by roasting the nickel complex hydroxide, moisture contained in the nickel complex hydroxide was removed, and then the nickel complex oxide represented by $Ni_{0.88}Co_{0.09}Al_{0.03}O$ was converted to and recovered.

The obtained nickel complex oxide was evaluated as follows.

(1) Carbon Content

The obtained nickel complex oxide was measured by the high-frequency combustion-infrared absorption method using a carbon analyzer (model: CS-600, manufactured by LECO Co., Ltd.), and it was confirmed to be 0.07% by mass.

(2) The mass ratio of aluminum in the aluminum compound present on the particle surfaces of the nickel complex oxide to the nickel complex oxide In addition, when the obtained nickel complex oxide was calculated as the mass ratio of aluminum in the aluminum compound present on the particle surfaces of the nickel complex oxide to the nickel complex oxide, it was confirmed that the mass ratio was 1.4% by mass.

The mass ratio of the aluminum compound present on the particle surfaces of the nickel complex oxide to the nickel complex oxide was evaluated by the following procedure.

First, the obtained nickel complex oxide was water-washed to prepare a sample of the nickel complex oxide after water-washing.

The sample of the nickel complex oxide after water-washing was prepared according to the following procedure. First, pure water having an electrical conductivity of 1 μS/cm and 20° C. was added to the nickel complex oxide obtained after the roasting process, and the slurry, which was adjusted so that the electrical conductivity of the liquid part of the slurry was 45 mS/cm, was stirred for 20 minutes, water-washed, and then filtered through a filter press. The resulting filtrated material was dried under a vacuum at 150° C. for 10 hours to obtain a nickel complex oxide after water-washing.

The aluminum content of the aluminum compound contained in the nickel complex oxide before and after water-washing was then measured. "Before water-washing" means a nickel complex oxide that has not been subjected to water-washing. The aluminum content of the aluminum compound contained in the nickel complex oxide before and after water-washing was measured using ICP-AES (Inductively Coupled Plasma-Atomic Emission Spectrometry (ICP Emission Spectrometry), Model: ICPE-9000, Shimadzu Corporation).

The aluminum content of the aluminum compound contained in the nickel complex oxide before and after water-washing is calculated as the content per unit mass of the nickel complex oxide before water-washing.

Then, the obtained measurement values were used to calculate the mass ratio of aluminum in the aluminum compound present on the particle surfaces of the nickel complex oxide to the nickel complex oxide.

Specifically, it was calculated by the following Equation (1).

(Mass ratio of aluminum in aluminum compound present on particle surfaces of nickel complex oxide to nickel complex oxide)=$(Al_{before}-Al_{after})/W \times 100$    (1)

In addition, $Al_{before}$, $Al_{after}$, and $W$ in Equation (1) above each have the following meanings.

$Al_{before}$: Aluminum content of aluminum compound in nickel complex oxide before water-washing $Al_{after}$: Aluminum content of aluminum compound in nickel complex oxide after water-washing W: Unit mass of nickel complex oxide before water-washing (3) Specific Surface Area The specific surface area of the obtained nickel complex oxide was 58.4 $m^2/g$ as evaluated by a fully automatic specific surface area measurement apparatus (Model: Macsorb HM model-1220, manufactured by Mountech Co., Ltd.). In the following other examples and comparative examples, the specific surface area is evaluated using the same device.

(Manufacture of Lithium Nickel Complex Oxides)

A mixture of a lithium compound and the above-described nickel complex oxide was prepared by the following procedure (mixing process).

As the lithium compound, lithium hydroxide monohydrate (LiOH·H2O) was subjected to an anhydrous treatment by vacuum drying, and the resulting anhydrous lithium hydroxide was used.

In the mixing process, a lithium compound and a nickel complex oxide were weighed and mixed so that the ratio of the number of atoms in the mixture represented by Li/Me was 1.030. Here, Me means the total number of atoms of a metal other than Li, which is the sum of Ni, Co, and Al.

The mixture obtained in the mixing process was loaded into a firing vessel having an internal dimension of 280 mm(L)×280 mm(W)×90 mm(H), and fired by keeping at 765° C. for 220 minutes in an atmosphere with an oxygen concentration of 80 vol % or higher using a continuous firing furnace, Roller Hearth Kiln (firing process).

The resulting fired product was added with pure water having an electrical conductivity of 1 μS/cm at 20° C. to make a slurry including a liquid part adjusted to have an electrical conductivity of 45 mS/cm. Then, the slurry was stirred for 50 minutes, water-washed, then filtered through a filter press, and dried under a vacuum atmosphere at 150° C. for 10 hours to obtain a lithium nickel complex oxide represented by $Li_{0.985}Ni_{0.88}Co_{0.09}Al_{0.03}O_2$.

(Manufacture of Non-Aqueous Electrolyte Secondary Battery)

The resulting lithium nickel complex oxide was used as a cathode active material to produce a secondary battery including a cathode. Its performance (a charging capacity, a reaction resistance, and cycle characteristics) was evaluated. The cathode active material was evaluated using a coin battery 10 of the type 2032 illustrated in FIG. 1.

Figure 1:
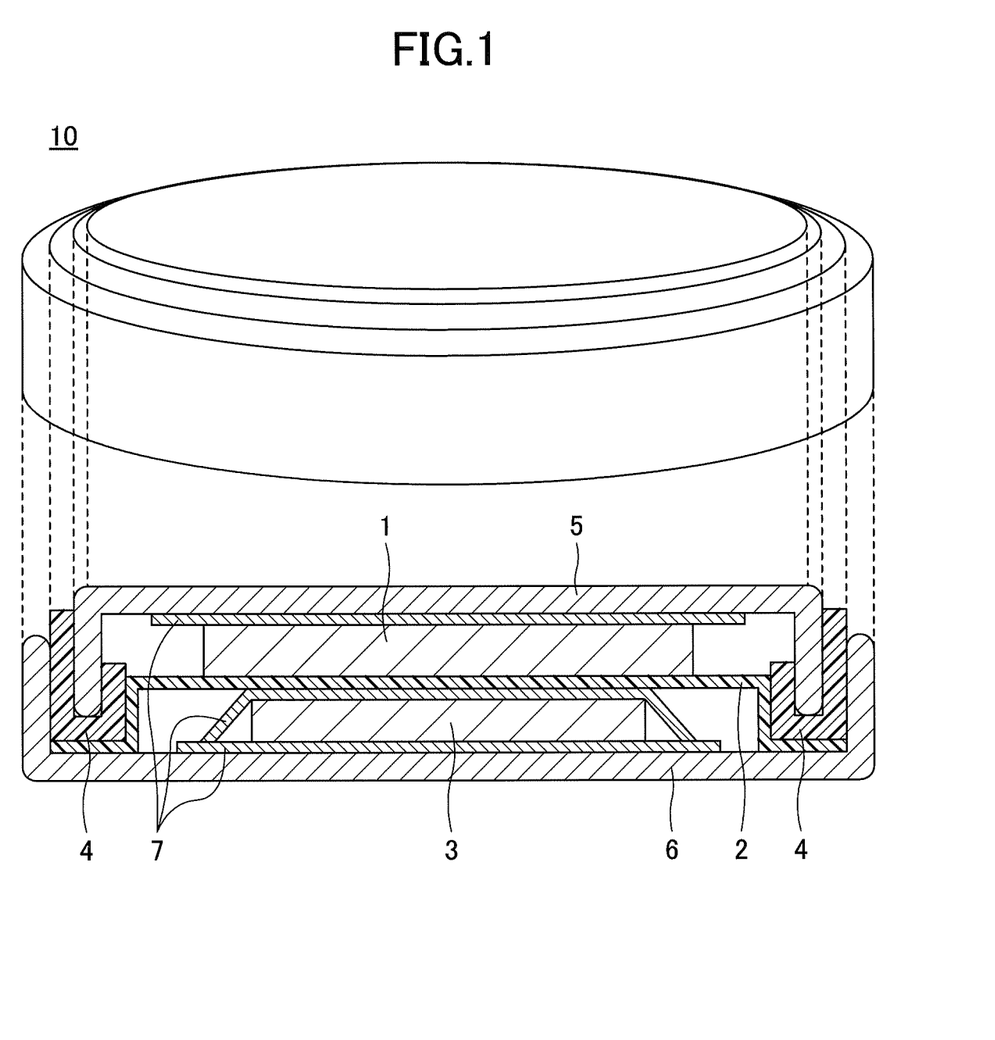
FIG. 1 is an explanatory view of a cross-sectional structure of a coin battery fabricated in Example 1 according to the invention.

Specifically, the cathode 3 was prepared by mixing lithium nickel complex oxide of 52.5 mg, which is the above-described cathode active material, acetylene black of 15 mg, and PTEE of 7.5 mg, pressing it to have a diameter of 11 mm and a thickness of 100 μm at a pressure of 100 MPa, and drying it in a vacuum dryer at 120° C. for 12 hours.

The cathode 3 was then used to make the coin battery 10 of the type 2032 having the structure illustrated in FIG. 1 in a glove box in an argon (Ar) atmosphere with a dew point controlled at −80° C. Lithium metal having a diameter of 17 mm and a thickness of 1 mm was used for the anode 1 of the coin battery 10 of the type 2032, lithium metal having a diameter of 17 mm and a thickness of 1 mm was used. For the electrolyte, an equal volume mixture of ethylene carbonate (EC) and diethyl carbonate (DEC) using $LiClO_4$ of 1M as the supporting electrolyte (manufactured by Toyama Pharmaceutical Co., Ltd.) was used. In addition, a polyethylene porous membrane having a thickness of 25 μm was used as the separator 2. The case of the coin battery 10 of the type 2032 includes a cathode can 6 which is hollowed out and has an open end, and an anode can 5 which is to be disposed in an opening of the cathode can 6. When the anode can 5 is disposed in the opening of the cathode can 6, a space for accommodating the electrodes is formed between the anode can 5 and the cathode can 6. The case also includes a gasket 4 and is assembled into a coin-like battery cell with the cathode can 6 and the anode can 5.

The cathode 3 and the anode 1 are accommodated in the case so that the anode 3 contacts the inner surface of the cathode can 6 through the current collector 7 and the anode 1 contacts the inner surface of the anode can 5 through the current collector 7. The current collector 7 is also disposed between the cathode 3 and the separator 2.

The coin battery 10 of the type 2032 was made and left for about 24 hours. After the open circuit voltage OCV (Open Circuit Voltage) was stabilized, the current density relative to the cathode was set to 0.1 $mA/cm^2$, and the charging capacity (initial charging capacity) was used as the capacity when charging until the cut-off voltage became 4.3 V. A multi-channel voltage/current generator (Type R6741A, manufactured by Advantest Co., Ltd.) was used to measure the charging capacity.

Figure 2A:
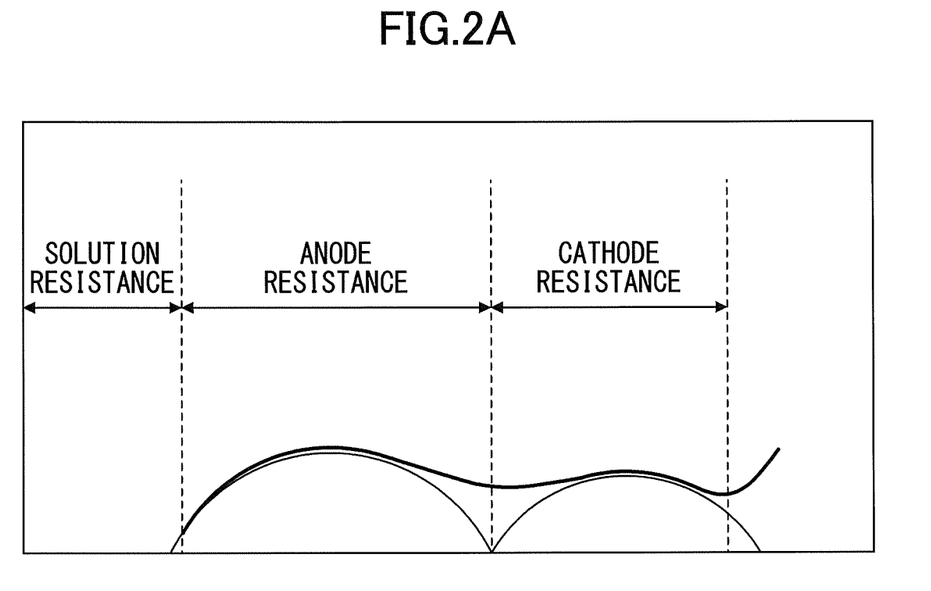
FIG. 2A illustrates an example of measuring impedance evaluation.
Figure 2B:
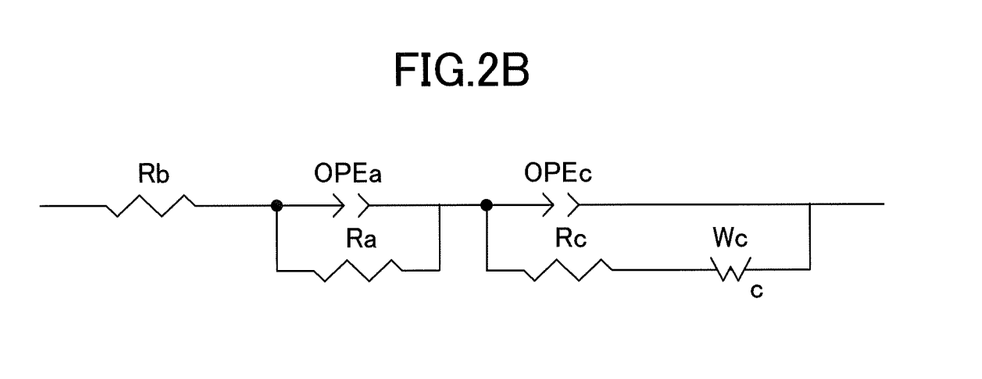
FIG. 2B schematically illustrates an equivalent circuit used to analyze an impedance evaluation.

The resistance was measured by the AC impedance method using the coin battery 10 of the type 2032 charged with a charge potential of 4.1 V. The frequency response analyzer and potentiogalvanostat (Type 1255B, manufactured by Solatron) were used for the measurements to obtain a Nyquist plot illustrated in FIG. 2A. Because the plot appears as the sum of the solution resistance, the anode resistance and the capacitance, and the characteristic curve indicating the cathode resistance and the capacitance, the fitting calculation was performed using the equivalent circuit illustrated in FIG. 2B, and the value of the cathode resistance (reaction resistance) was calculated. The reaction resistance of the present example is listed in Table 1 as the reaction resistance ratio using the reaction resistance value (described below) in Comparative Example 1 as a reference value. Examples 1 to 4 and Comparative Examples 1 to 3 show the reaction resistance as a ratio of the reaction resistance value in Comparative Example 1 to the reaction resistance value in 1.

Cycle characteristics were also evaluated using the made coin battery 10 of the type 2032. The cycle characteristics were evaluated by measuring the capacity keeping rate after 500 cycles of charge and discharge. Specifically, thus made coin battery 10 of the type 2032 was evaluated by charging up to a cut-off voltage of 4.9 V with a current density of 0.3 mA/cm2 in a thermostatic bath kept at 25° C., was subjected to one hour pause, and was provided with conditioning of repeating 5 cycles so as to discharge up to a cut-off voltage of 3.5 V, charging up to a cut-off voltage of 4.9 V with a current density of 2.0 mA/cm2 in a thermostatic bath held at 60° C., and repeating for 500 cycles of discharging up to a cut-off voltage of 3.5 V after a 1-hour pause, and was measured to obtain the discharging capacity of each cycle.

Then, in a case where the capacity keeping rate calculated by dividing the discharging capacity obtained in the cycle after 500 cycles after the conditioning by the discharging capacity obtained in the first cycle after the conditioning of the coin battery is 70% or higher, it is evaluated "A" as being excellent in the cycle characteristics. On the other hand, if the capacity keeping rate is lower than 70%, the cycle characteristics are evaluated "B" as having insufficient cycle characteristics.

Evaluation results are given in Table 1.

Examples 2 to 4

In manufacturing the nickel complex oxide, the nickel complex oxide was made and evaluated in the same manner as Example 1 except that the roasting temperature of the nickel complex hydroxide was changed as illustrated in Table 1. In Examples 2 to 4, the nickel complex oxide represented by $Ni_{0.88}Co_{0.09}Al_{0.03}O$ was obtained after the roasting process.

Then, the obtained nickel complex oxide was used to manufacture and evaluate the lithium nickel complex oxide and the non-aqueous electrolyte secondary battery in the same manner as Example 1. In Examples 2 to 4, the lithium nickel complex oxide represented by $Li_{0.985}Ni_{0.88}Co_{0.09}Al_{0.03}O_2$ was obtained.

The results are given in Table 1.

Comparative Examples 1 to 3

In manufacturing the nickel complex oxide, the nickel complex oxide was made and evaluated in the same manner as Example 1 except that the roasting temperature of the nickel complex hydroxide was changed as described in Table 1.

Then, the obtained nickel complex oxide was used to manufacture and evaluate the lithium nickel complex oxide and the non-aqueous electrolyte secondary battery in the same manner as Example 1.

The results are given in Table 1.

Examples 5 Through 9

In manufacturing the nickel complex oxide, the nickel complex oxide was made in the same manner as Example 1 except that $Ni_{0.91}Co_{0.045}Al_{0.045}(OH)_2$, which was prepared by the crystallization method as the nickel complex hydroxide, was prepared, the nickel complex hydroxide was used, and the roasting temperature, the rate of temperature rise, and the roasting time (keeping time) of the nickel complex hydroxide were changed as described in Table 1. Then, the evaluation of the nickel complex oxide thus made was performed. Incidentally, in Examples 5 to 9, after the roasting process, the nickel complex oxide represented by $Ni_{0.91}Co_{0.045}Al_{0.045}O$ was obtained.

Then, the obtained nickel complex oxide was used to manufacture and evaluate the lithium nickel complex oxide and the non-aqueous electrolyte secondary battery in the same manner as Example 1. In Examples 5 to 9, the lithium nickel complex oxide represented by $Li_{0.980}Ni_{0.91}Co_{0.045}Al_{0.045}O_2$ was obtained.

In addition, in the evaluation of the reaction resistance ratio, the reaction resistance value in Comparative Example 4 described below having the same composition is 1, and the reaction resistance is indicated as the ratio of the reaction resistance value to 1.

Comparative Example 4

When the nickel complex oxide was manufactured, the nickel complex oxide was made in the same manner as Example 5 except that the roasting temperature, the rate of temperature rise, and the keeping time of the nickel complex hydroxide were changed as described in Table 1, and the evaluation was performed.

Then, the obtained nickel complex oxide was used to manufacture and evaluate the lithium nickel complex oxide and the non-aqueous electrolyte secondary battery in the same manner as the case of Example 5.

TABLE 1

| | COMPOSITION OF METAL OF NICKEL COMPLEX HYDROXIDE | ROASTING PROCESS | | | EVALUATION RESULT OF NICKEL COMPLEX OXIDE CARBON CONTENT (% BY MASS) |
| --- | --- | --- | --- | --- | --- |
| | | ROASTING TEMPERATURE (° C.) | RATE OF TEMPERATURE RISE (° C./MINUTE) | ROASTING TIME (HOUR) | |
| EXAMPLE 1 | $Ni_{0.88}Co_{0.09}Al_{0.03}$ | 500 | 10.0 | 3 | 0.07 |
| EXAMPLE 2 | $Ni_{0.88}Co_{0.09}Al_{0.03}$ | 600 | 10.0 | 3 | 0.05 |
| EXAMPLE 3 | $Ni_{0.88}Co_{0.09}Al_{0.03}$ | 700 | 10.0 | 3 | 0.03 |
| EXAMPLE 4 | $Ni_{0.88}Co_{0.09}Al_{0.03}$ | 480 | 10.0 | 3 | 0.13 |
| COMPARATIVE EXAMPLE 1 | $Ni_{0.88}Co_{0.09}Al_{0.03}$ | 400 | 10.0 | 3 | 0.19 |
| COMPARATIVE EXAMPLE 2 | $Ni_{0.88}Co_{0.09}Al_{0.03}$ | 350 | 10.0 | 3 | 0.18 |
| COMPARATIVE EXAMPLE 3 | $Ni_{0.88}Co_{0.09}Al_{0.03}$ | 450 | 10.0 | 3 | 0.16 |

TABLE 1-continued

| | | | | | |
|---|---|---|---|---|---|
| EXAMPLE 5 | $Ni_{0.91}Co_{0.045}Al_{0.045}$ | 690 | 9.2 | 2 | 0.06 |
| EXAMPLE 6 | $Ni_{0.91}Co_{0.045}Al_{0.045}$ | 650 | 8.6 | 2 | 0.08 |
| EXAMPLE 7 | $Ni_{0.91}Co_{0.045}Al_{0.045}$ | 525 | 7.0 | 2 | 0.15 |
| EXAMPLE 8 | $Ni_{0.91}Co_{0.045}Al_{0.045}$ | 730 | 10.0 | 3 | 0.03 |
| EXAMPLE 9 | $Ni_{0.91}Co_{0.045}Al_{0.045}$ | 750 | 10.0 | 3 | 0.02 |
| COMPARATIVE EXAMPLE 4 | $Ni_{0.91}Co_{0.045}Al_{0.045}$ | 450 | 6.0 | 2 | 0.20 |

| | EVALUATION RESULT OF NICKEL COMPLEX OXIDE | | EVALUATION RESULT OF NON-AQUEOUS ELECTROLYTE SECONDARY BATTERY | | |
|---|---|---|---|---|---|
| | A MASS RATIO OF ALUMINUM CONTAINED IN ALUMINUM COMPOUNDS PRESENTING ON THE SURFACE OF PARTICLES OF NICKEL COMPLEX OXIDE (% BY MASS) | SPECIFIC SURFACE AREA ($m^2/g$) | REACTION RESISTANCE RATIO | CHARGING CAPACITY (mAh/g) | CYCLE CHARACTERISTICS |
| EXAMPLE 1 | 1.4 | 58.4 | 0.71 | 230 | B |
| EXAMPLE 2 | 2.2 | 46.0 | 0.65 | 231 | A |
| EXAMPLE 3 | 3.0 | 38.5 | 0.59 | 231 | A |
| EXAMPLE 4 | 0.7 | 73.0 | 0.80 | 229 | B |
| COMPARATIVE EXAMPLE 1 | 0.0 | 125.6 | 1.00 | 228 | B |
| COMPARATIVE EXAMPLE 2 | 0.0 | 108.4 | 0.98 | 228 | B |
| COMPARATIVE EXAMPLE 3 | 0.0 | 95.1 | 0.96 | 229 | B |
| EXAMPLE 5 | 3.2 | 50.0 | 0.72 | 238 | A |
| EXAMPLE 6 | 2.4 | 62.0 | 0.76 | 236 | A |
| EXAMPLE 7 | 1.1 | 82.5 | 0.86 | 235 | B |
| EXAMPLE 8 | 5.8 | 44.0 | 0.71 | 239 | A |
| EXAMPLE 9 | 8.3 | 35.0 | 0.68 | 240 | B |
| COMPARATIVE EXAMPLE 4 | 0.0 | 105.2 | 1.00 | 233 | B |

According to the results described in Table 1, it was confirmed that the reaction resistance ratio of Examples 1 to 4 using the nickel complex oxide having the carbon content of 0.15% or lower can be reduced by 10% or higher compared to Comparative Examples 1 to 3, in which the carbon content does not satisfy the above-described range.

It was also confirmed that the reaction resistance ratio of Examples 5 to 9 using the nickel complex oxide having the carbon content of 0.15% or lower was reduced by 10% or higher compared to Comparative Example 4. From the above results, it was confirmed that carbon derived from the nickel complex oxide had an effect on the reaction resistance of the lithium nickel complex oxide. By suppressing the carbon content of the nickel complex oxide as the raw material, the reaction resistance was suppressed when the lithium nickel complex oxide was used as a non-aqueous electrolyte secondary battery, and it was confirmed that the high-power battery is obtainable.

In addition, it was confirmed that the cycle characteristics of Examples 2, 3, 5, 6, and 8 in which aluminum in the aluminum compound present on the particle surfaces of the nickel complex oxide has a mass ratio of 1.5% by mass or higher and 7.0% by mass or lower in the nickel complex oxide were excellent.

Although the methods of manufacturing the nickel complex oxide and the lithium nickel complex oxide have been described with reference to the embodiments and examples, the present invention is not limited to the above-described embodiments and examples, etc. Various modifications and variations are possible within the scope of the scope of the invention as defined in the claims.

This application claims priority to Japanese Patent Office Application No. 2017-207646 filed Oct. 26, 2017, the entire contents of which are incorporated herein by reference.

The invention claimed is:

1. A nickel complex oxide comprising:
a carbon content of 0.15% by mass or lower,
wherein a specific surface area of the nickel complex oxide is 30 $m^2/g$ or more and 90 $m^2/g$ or less,
wherein the nickel complex oxide is a raw material for manufacturing a lithium nickel complex oxide.

2. The nickel complex oxide according to claim 1,
wherein aluminum in an aluminum compound present on particle surfaces of the nickel complex oxide has a mass ratio of 1.5% by mass and higher and 7.0% by mass or lower in the nickel complex oxide.

3. A method of manufacturing a lithium nickel complex oxide, the method comprising:
a mixing process of preparing a mixture of the nickel complex oxide according to claim 1 and a lithium compound; and
a firing process of firing the mixture.

* * * * *